US012576632B2

(12) United States Patent
Katakura et al.

(10) Patent No.: US 12,576,632 B2
(45) Date of Patent: Mar. 17, 2026

(54) METHOD FOR DRIVING LIQUID EJECTING APPARATUS AND LIQUID EJECTING APPARATUS

(71) Applicant: SEIKO EPSON CORPORATION, Tokyo (JP)

(72) Inventors: Takahiro Katakura, Okaya (JP); Toshiro Murayama, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 172 days.

(21) Appl. No.: 18/491,884

(22) Filed: Oct. 23, 2023

(65) Prior Publication Data

US 2024/0131838 A1 Apr. 25, 2024
US 2024/0227387 A9 Jul. 11, 2024

(30) Foreign Application Priority Data

Oct. 25, 2022 (JP) ................................ 2022-170426

(51) Int. Cl.
*B41J 2/045* (2006.01)

(52) U.S. Cl.
CPC ....... *B41J 2/04536* (2013.01); *B41J 2/04581* (2013.01)

(58) Field of Classification Search
CPC ................ B41J 2/04536; B41J 2/04581; B41J 2002/14419; B41J 2002/14491; B41J 2202/03; B41J 2/04541; B41J 2/04571; B41J 2/14233; B41J 2002/14354; B41J 2/04588
See application file for complete search history.

(56) References Cited

FOREIGN PATENT DOCUMENTS

JP 2020032622 A * 3/2020

OTHER PUBLICATIONS

Ochi Kazuhiro, Liquid Injection Device and Discharge Signal Correction Method for Liquid Injection Device (JP 2020032622 A), May 3, 2020, [Liquid Ejector, Method of Correcting Discharge Signal of Liquid Injection Device, and Method of Correcting Ejection Signal] (Year: 2020).*

* cited by examiner

*Primary Examiner* — Lisa Solomon
(74) *Attorney, Agent, or Firm* — WORKMAN NYDEGGER

(57) ABSTRACT

A method for driving a liquid ejecting apparatus includes storing initial information on a residual vibration that occurs in the pressure chamber when the inspection signal is supplied at a first timing to the pressure generating element, storing determination target information on a residual vibration that occurs in the pressure chamber when the inspection signal is supplied at a second timing later than the first timing to the pressure generating element, and determining a property change in the pressure generating element based on the initial information, the determination target information, and correspondence information on, for each viscosity of the liquid in the pressure chamber, a correspondence between an amplitude of the residual vibration and a displacement amount of the pressure generating element.

13 Claims, 12 Drawing Sheets

METHOD FOR DRIVING LIQUID EJECTING APPARATUS AND LIQUID EJECTING APPARATUS

The present application is based on, and claims priority from JP Application Serial Number 2022-170426, filed Oct. 25, 2022, the disclosure of which is hereby incorporated by reference herein in its entirety.

BACKGROUND

1. Technical Field

The present disclosure relates to a method for driving a liquid ejecting apparatus, and a liquid ejecting apparatus.

2. Related Art

A liquid ejecting apparatus, which is represented by an ink jet printer, typically includes a nozzle that ejects a liquid, a pressure chamber communicating with the nozzle, and a pressure generating element that generates pressure fluctuations in the liquid within the pressure chamber.

In such a liquid ejecting apparatus, a property change in the pressure generating element may be determined based on a residual vibration, which is a vibration remaining in the pressure chamber after driving of the pressure generating element. For example, an apparatus disclosed in JP-A-2020-32622 determines the degree of degradation over time of a piezoelectric element based on a difference between the initial value of the residual vibration and a detection value of the residual vibration obtained later.

The waveform of a residual vibration not only changes with a property change in the pressure generating element but also changes depending on a change in viscosity of a liquid within the pressure chamber. With the apparatus disclosed in JP-A-2020-32622, when the viscosity of a liquid within the pressure chamber changes, for example, due to the usage environment or the lapse of time, it is difficult to accurately determine a property change in the pressure generating element.

SUMMARY

According to an aspect of the present disclosure, a method for driving a liquid ejecting apparatus is provided. The liquid ejecting apparatus includes a head including a nozzle configured to eject a liquid, a pressure chamber communicating with the nozzle, and a pressure generating element configured to generate a pressure fluctuation in a liquid within the pressure chamber, and a signal generator configured to generate an inspection signal that causes a pressure fluctuation of the liquid within the pressure chamber by being supplied to the pressure generating element. The method includes storing initial information on a residual vibration that occurs in the pressure chamber when the inspection signal is supplied at a first timing to the pressure generating element, storing determination target information on a residual vibration that occurs in the pressure chamber when the inspection signal is supplied at a second timing later than the first timing to the pressure generating element, and determining a property change in the pressure generating element based on the initial information, the determination target information, and correspondence information on, for each viscosity of the liquid in the pressure chamber, a correspondence between an amplitude of a residual vibration and a displacement amount of the pressure generating element.

According to another aspect of the present disclosure, a liquid ejecting apparatus includes a head, a signal generator, a detector, a storage, and a determiner. The head includes a nozzle configured to eject a liquid, and a pressure chamber communicating with the nozzle, and a pressure generating element configured to generate a pressure fluctuation in a liquid within the pressure chamber. The signal generator is configured to generate an inspection signal that causes a pressure fluctuation of the liquid within the pressure chamber by being supplied to the pressure generating element. The detector is configured to detect a residual vibration that occurs in the pressure chamber when the inspection signal is supplied to the pressure generating element. The storage stores initial information on the residual vibration that is detected by the detector when the inspection signal is supplied at a first timing to the pressure generating element, determination target information on the residual vibration that is detected by the detector when the inspection signal is supplied at a second timing later than the first timing to the pressure generating element, and correspondence information on, for each viscosity of a liquid within the pressure chamber, a correspondence between an amplitude of a residual vibration and a displacement amount of the pressure generating element. The determiner is configured to determine a property change in the pressure generating element based on the initial information, the determination target information, and the correspondence information.

DESCRIPTION OF EMBODIMENTS

Figure 1:
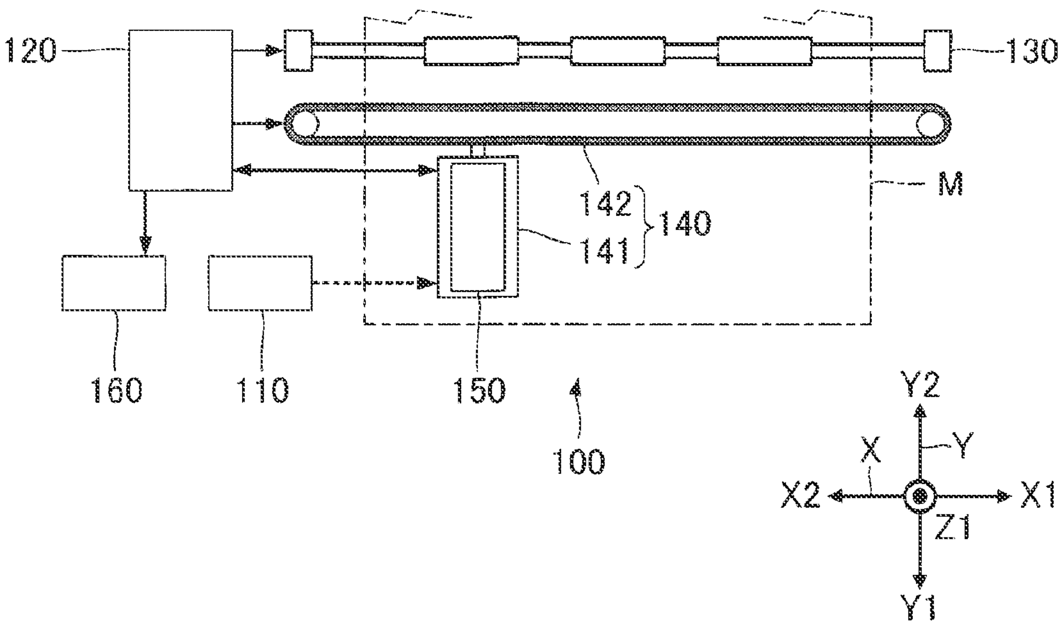
FIG. 1 is a diagram illustrating an exemplary configuration of a liquid ejecting apparatus according to a first embodiment.

Embodiments according to the present disclosure will be described hereafter with reference to the accompanying drawings. The dimensions and scales of elements in the drawings are appropriately different from actual ones, and some of the elements are schematically illustrated for ease of understanding. In addition, the scope of the present disclosure is not limited to these embodiments as long as there is no description in the following sections to the effect that the present disclosure is particularly limited.

In the following sections, a description will be given using the X-axis, Y-axis, and Z-axis intersecting each other as appropriate for convenience of identification of a location, direction, or the like. In addition, hereafter, one direction of the X-axis is referred to as an X1 direction and a direction opposite to the X1 direction is referred to as an X2 direction. Similarly, the directions opposite to each other of the Y-axis are referred to as a Y1 direction and a Y2 direction. In addition, the directions opposite to each other of the Z-axis are referred to as a Z1 direction and a Z2 direction.

Here, typically, the Z-axis is the vertical axis, and the Z2 direction corresponds to the downward vertical direction. However, the Z-axis may not be the vertical axis. In addition, the X-axis, Y-axis, and Z-axis, which are typically, but not limited to, axes perpendicular to each other, may intersect each other, for example, at an angle greater than or equal to 80° and less than or equal to 100°.

A: First Embodiment

A1: Overall Configuration of Liquid Ejecting Apparatus

FIG. 1 is a diagram illustrating an exemplary configuration of a liquid ejecting apparatus 100 according to a first embodiment. The liquid ejecting apparatus 100 is an ink jet printing apparatus that ejects ink, which is an exemplary liquid, as droplets toward a medium M. The medium M is, for example, a printing paper sheet. The medium M is not limited to a printing paper sheet and may be, for example, a printing target of any material such as a resin film or fabric cloth.

As illustrated in FIG. 1, the liquid ejecting apparatus 100 includes a liquid container 110, a control module 120, a transport mechanism 130, a movement mechanism 140, and a head module 150.

The liquid container 110 stores ink. Specific examples of the liquid container 110 include a cartridge attachable to or detachable from the liquid ejecting apparatus 100, a bag-like ink pack formed of a flexible film, and an ink tank that is refillable with ink. Any type of ink may be stored in the liquid container 110.

The control module 120 controls operations of elements of the liquid ejecting apparatus 100. The control module 120 will be described in more detail later with reference to FIG. 2.

The transport mechanism 130 transports the medium M along the Y-axis under control of the control module 120.

The movement mechanism 140 moves the head module 150 forwards and backwards along the X-axis under control of the control module 120. The movement mechanism 140 includes an approximately box-shaped transport member 141 referred to as a carriage, which accommodates the head module 150, and an endless transport belt 142, to which the transport member 141 is fixed. The number of the head modules 150 mounted on the transport member 141 is not limited to one and may be two or more. In addition to the head module 150, the liquid container 110 mentioned above may be mounted on the transport member 141.

The head module 150 ejects ink, which is supplied from the liquid container 110, from each of a plurality of nozzles onto the medium M under control of the control module 120. The ejecting is performed in parallel with transportation of the medium M by the transport mechanism 130 and the forward and backward movement of the head module 150 caused by the movement mechanism 140. Thus, an image is formed by ink on the surface of the medium M.

A display device 160 displays various types of information under control of the control module 120. Here, the display device 160 includes, for example, each type of display panel, such as a liquid crystal display panel or an organic electroluminescent (EL) display panel. According to the present embodiment, the display device 160 displays information on a property change in a piezoelectric element 56 described later.

A2: Electrical Configuration of Liquid Ejecting Apparatus

Figure 2:
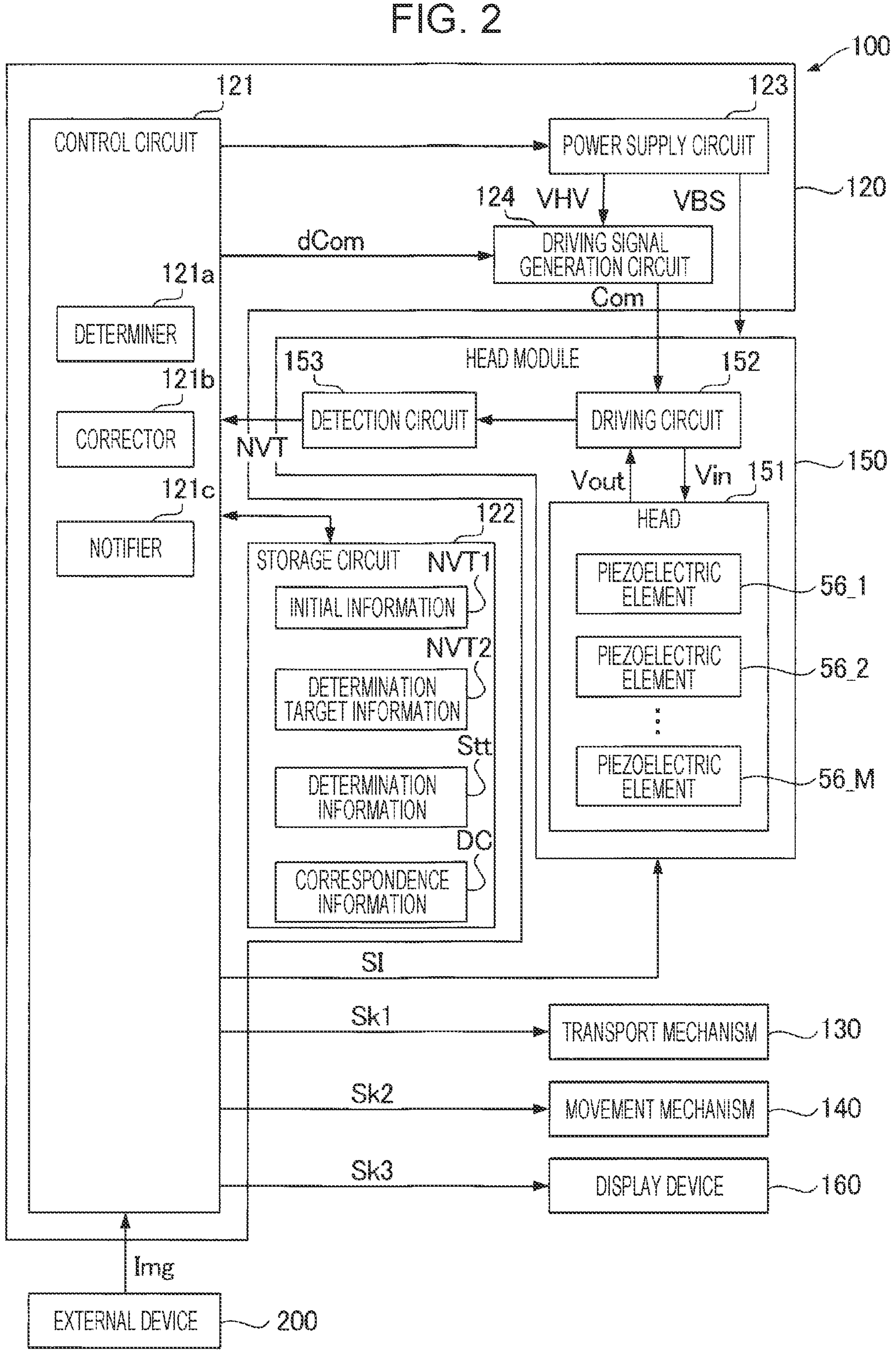
FIG. 2 is a block diagram illustrating an electrical configuration of the liquid ejecting apparatus according to the first embodiment.

FIG. 2 is a block diagram illustrating an electrical configuration of the liquid ejecting apparatus 100 according to the first embodiment. As illustrated in FIG. 2, the head module 150 includes a head 151, a driving circuit 152, and a detection circuit 153, which is an exemplary detector.

The head 151 includes M piezoelectric elements 56_1 to 56_M respectively provided for nozzles, and ejects ink from the nozzles by driving the piezoelectric elements 56_1 to 56_M. M is a natural number greater than or equal to two. Hereafter, the piezoelectric elements 56_1 to 56_M may be referred to as the piezoelectric elements 56 when they are not discriminated from each other. In addition, subscripts, 1 to_M or [1] to [M], may be used hereafter for M other components corresponding to the piezoelectric elements 56 in the liquid ejecting apparatus 100, indicating the correspondence between each of the M other components and a respective one of the piezoelectric elements 56_1 to 56_M.

Here, in response to receiving a supply driving signal Vin, each piezoelectric element 56 is driven by inverse piezoelectricity. In addition, each piezoelectric element 56 outputs an output signal Vout because of piezoelectricity. The head 151 will be described in detail later with reference to FIG. 3.

In the example illustrated in FIG. 2, the number of the heads 151 included in the head module 150 is, but is not limited to, one. The number of the heads 151 included in the head module 150 may be two or more.

The driving circuit 152 drives the piezoelectric elements 56 under control of the control module 120. Specifically, under control of the control module 120, the driving circuit 152 switches between supplying and not supplying a driving signal Com output from the control module 120, as the supply driving signal Vin, to each of the plurality of piezoelectric elements 56 included in the head 151. In addition, according to the present embodiment, under control of the control module 120, the driving circuit 152 switches between causing and not causing an electromotive force in each of the plurality of piezoelectric elements 56 included in the head 151 to be supplied, as the output signal Vout, to the detection circuit 153. The driving circuit 152 will be described in detail later with reference to FIG. 4.

The detection circuit 153 detects residual vibrations that occur in the pressure chamber C when an inspection signal PD2 described later is supplied to the piezoelectric element 56. Here, the detection circuit 153 generates vibration information NVT, which indicates the residual vibrations, based on the output signal Vout generated in each piezoelectric element 56. For example, the detection circuit 153 generates the vibration information NVT by amplifying the output signal Vout after noise removal. The residual vibration is a vibration remaining in the pressure chamber C after driving of the piezoelectric element 56. The residual vibration will be described in detail later with reference to FIGS. 7 to 10.

As illustrated in FIG. 2, the control module 120 includes a control circuit 121, a storage circuit 122, which is an exemplary storage, a power supply circuit 123, and a driving signal generation circuit 124, which is an exemplary signal generator.

The control circuit 121 has a function of controlling the operations of each component of the liquid ejecting apparatus 100 and a function of processing various types of data.

The control circuit 121 includes, for example, one or more processors such as central processing units (CPUs). The control circuit 121 may include a programmable logic device, such as a field-programmable gate array (FPGA), instead of or in addition to the CPUs. In addition, when the control circuit 121 is comprised of a plurality of processors, for example, operations of the driving circuit 152 and operations of the detection circuit 153 may be controlled by different processors. In addition, when the control circuit 121 is comprised of a plurality of processors, the plurality of processors may be mounted on substrates different from each other.

The storage circuit 122 stores various programs, which are executed by the control circuit 121, and various types of data such as print data Img, which are processed by the control circuit 121. The storage circuit 122 includes a semiconductor memory of one or both of, for example, a volatile memory, such as a random access memory (RAM), and a nonvolatile memory, such as a read-only memory (ROM), an electrically erasable programmable ROM (EEPROM), or a programmable ROM (PROM). The print data Img is supplied from an external device 200, such as a personal computer or a digital camera. The whole or part of the storage circuit 122 may be a part of the control circuit 121.

In the storage circuit 122, initial information NVT1, determination target information NVT2, correspondence information DC, and determination information Stt are stored.

The initial information NVT1 is information on a residual vibration that is detected in the detection circuit 153 when the inspection signal PD2 described later is supplied at a first timing to the piezoelectric element 56, and is, for example, the vibration information NVT, which is output from the detection circuit 153 at the beginning of the period of use of the head 151, or information based on the vibration information NVT. The determination target information NVT2 is information on a residual vibration that is detected in the detection circuit 153 when the inspection signal PD2 described later is supplied at a second timing later than the first timing to the piezoelectric element 56, and is, for example, the vibration information NVT, which is output from the detection circuit 153 after the lapse of a predetermined time period since the beginning, or information based on the vibration information NVT. The initial information NVT1 and the determination target information NVT2 will be described in detail later with reference to FIGS. 9 and 10.

The correspondence information DC is information on, for each viscosity of ink within the pressure chamber C, the correspondence between the amplitude of residual vibrations and the displacement amount ΔP of the piezoelectric element 56. The correspondence information DC will be described later with reference to FIG. 11.

The determination information Stt is information on a property change in the piezoelectric element 56 and is generated by a determiner 121*a* described later. For example, the determination information Stt indicates the rate of change, or the amount of change, in the displacement amount ΔP of the piezoelectric element 56 when the piezoelectric element 56 receives the inspection signal PD2 described later, relative to the displacement amount ΔP in the initial state.

The power supply circuit 123 is supplied with electric power from a commercial power supply (not illustrated) to generate various predetermined potentials. The generated various potentials are suitably supplied to the components of the liquid ejecting apparatus 100. For example, the power supply circuit 123 generates a power supply potential VHV and an offset potential VBS. The offset potential VBS is supplied to the head module 150. In addition, the power supply potential VHV is supplied to the driving signal generation circuit 124.

The driving signal generation circuit 124 is a circuit that generates the driving signal Com for driving each piezoelectric element 56. Specifically, the driving signal generation circuit 124 includes, for example, a digital-to-analog (DA) conversion circuit and an amplifying circuit. In the driving signal generation circuit 124, the DA conversion circuit converts a waveform specification signal dCom from the control circuit 121 from the digital signal to an analog signal, and the amplifying circuit amplifies the analog signal using the power supply potential VHV from the power supply circuit 123, thereby generating the driving signal Com. Here, among waveforms included in the driving signal Com, a signal of a waveform actually supplied to the piezoelectric element 56 (an ejection signal PD1 or the inspection signal PD2 described later) is the supply driving signal Vin mentioned above. The waveform specification signal dCom is a digital signal for defining the waveform of the driving signal Com.

In the control module 120 described above, the control circuit 121 controls the operations of components of the liquid ejecting apparatus 100 by executing a program stored in the storage circuit 122. Here, by executing the program, the control circuit 121 generates control signals Sk1 and Sk2, a control signal SI, and the waveform specification signal dCom as signals for controlling the operations of components of the liquid ejecting apparatus 100.

The control signal Sk1 is a signal for controlling the driving of the transport mechanism 130. The control signal Sk2 is a signal for controlling the driving of the movement mechanism 140. The control signal SI is a digital signal for specifying an operation state of the piezoelectric element 56. The control signal SI may include a timing signal for defining a driving timing of the piezoelectric element 56. The timing signal is, for example, generated based on an output of an encoder that detects the location of the transport member 141 mentioned above.

In addition, the control circuit 121 functions as the determiner 121*a*, a corrector 121*b*, and a notifier 121*c* by executing programs stored in the storage circuit 122.

At step S7 described later, the determiner 121*a* determines a property change in the piezoelectric element 56 based on the initial information NVT1, the determination target information NVT2, and the correspondence information DC. Here, the determiner 121*a* generates the determination information Stt as information indicating a determination result. The determiner 121*a* may make another determination of a state, such as an increased viscosity of ink or retention of bubbles in the flow channel of the head 151, based on the vibration information NVT. Information indicating a result of the other determination may be included in the determination information Stt or may be included in information other than the determination information Stt. In addition, the whole or part of the determiner 121*a* may be constituted by a circuit provided outside the control circuit 121.

At step S8 described later, the corrector 121*b* corrects the ejection signal PD1 described later based on the determination information Stt. This correction is performed as desired. For example, the corrector 121*b* determines, based on the determination information Stt, whether correction of the ejection signal PD1 is desirable. If it is determined that the correction is desirable, the corrector 121*b* corrects the ejection signal PD1 based on the determination information Stt. The corrector 121*b* may correct the ejection signal PD1 based on the vibration information NVT or the determination target information NVT2.

At step S9 described later, the notifier 121*c* provides a notification of information on a property change in the head 151 based on the determination information Stt. The notification is, for example, displayed by the display device 160. Examples of the information on a property change in the head 151 include information indicating the degree of a property change in the piezoelectric element 56, information for prompting the user to replace the head 151, and information indicating a predicted time for replacement of the head 151. The notification provided by the notifier 121*c* is not limited to being displayed with the display device 160. For example, the notification may be provided by turning on or switching on and off a light-emitting element such as a light-emitting diode (LED) or may be an audible notification.

A3: Head

Figure 3:
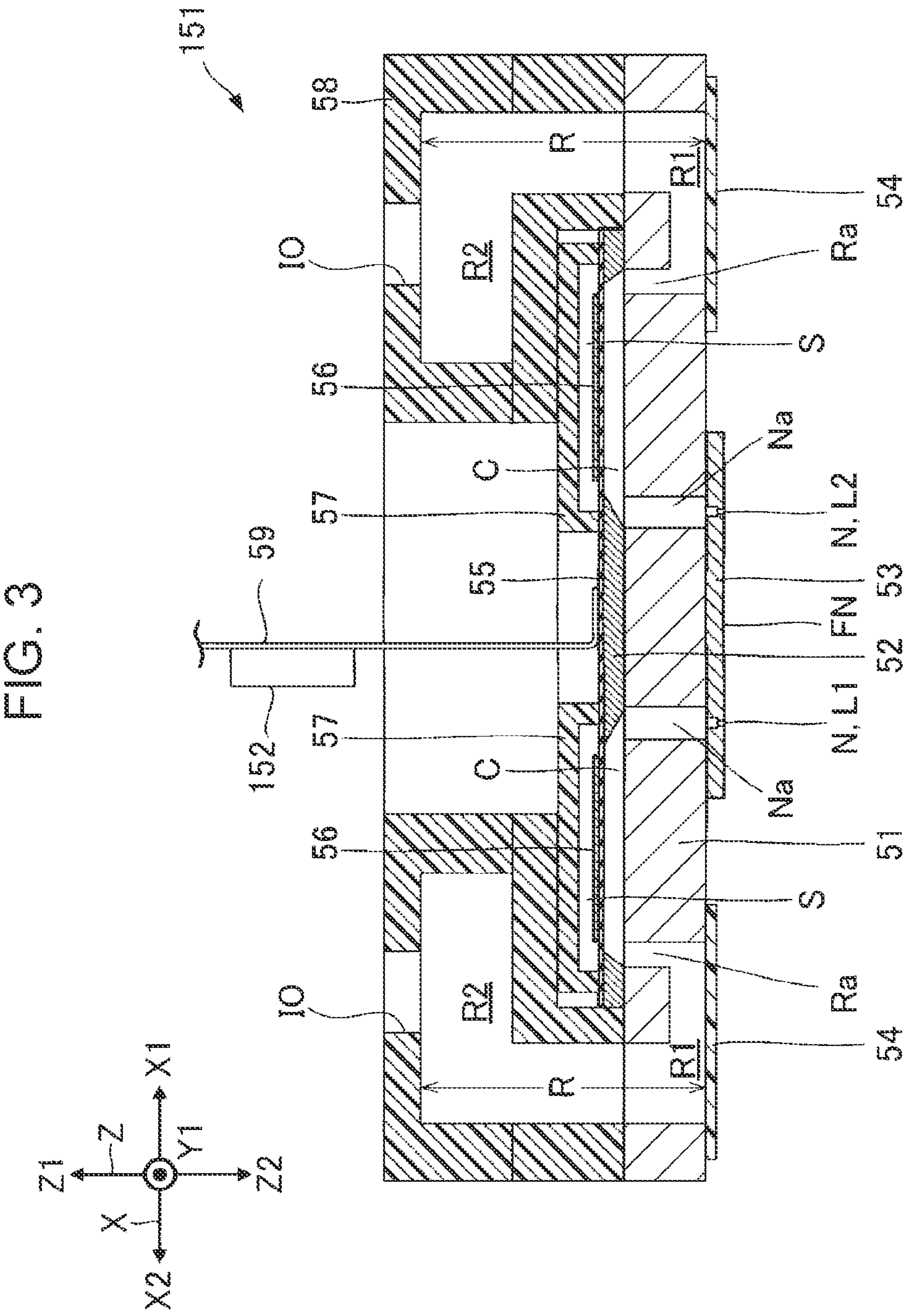
FIG. 3 is a sectional view of a head according to the first embodiment.

FIG. 3 is a sectional view of the head 151 according to the first embodiment. As illustrated in FIG. 3, the head 151 includes a plurality of nozzles N aligned in a direction of the Y-axis. The plurality of nozzles N are divided into a first row L1 and a second row L2 arranged apart from each other in a direction of the X-axis. Each of the first row L1 and the second row L2 is a set of a plurality of nozzles N linearly aligned in the direction of the Y-axis.

The head 151 is approximately symmetric in the direction of the X-axis. However, the locations of a plurality of nozzles N in the first row L1 and the locations of a plurality of nozzles N in the second row L2 may match each other or may differ from each other in the direction of the Y-axis. FIG. 3 illustrates a configuration in which the locations of the plurality of nozzles N in the first row L1 and the locations of the plurality of nozzles N in the second row L2 match each other in the direction of the Y-axis.

As illustrated in FIG. 3, the head 151 includes a channel substrate 51, a pressure chamber substrate 52, a nozzle plate 53, a pressure absorber 54, a diaphragm 55, a plurality of piezoelectric elements 56, which is an exemplary pressure generating element, a protective substrate 57, a case 58, and a wiring substrate 59.

The channel substrate 51 and the pressure chamber substrate 52 are stacked in this order in the Z1 direction to form a channel for supplying ink into the plurality of nozzles N. In an area located in the Z1 direction from the stack composed of the channel substrate 51 and the pressure chamber substrate 52, the diaphragm 55, the plurality of piezoelectric elements 56, the protective substrate 57, the case 58, the wiring substrate 59, and the driving circuit 152 are disposed. In contrast, in an area located in the Z2 direction from the stack, the nozzle plate 53 and the pressure absorber 54 are disposed. Elements of the head 151 are each a plate-like member that is long approximately in the Y-direction, and are bonded to each other, for example, by an adhesive. Hereafter, the elements of the head 151 will be described in order.

The nozzle plate 53 is a plate-like member in which a plurality of nozzles N in each of the first row L1 and the second row L2 are provided. Each of the plurality of nozzles N is a through-hole, through which ink passes, and ejects the ink. Here, the surface oriented in the Z2 direction of the nozzle plate 53 is a nozzle face FN. The nozzle plate 53 is manufactured, for example, by processing a silicon single crystalline substrate by using semiconductor manufacturing technology that uses processing techniques such as dry etching or wet etching. However, other known methods and materials may be used as appropriate for manufacture of the nozzle plate 53. In addition, the cross-sectional shape of a nozzle, which is typically, but not limited to, a circular shape, may be, for example, a non-circular shape such as a polygon or an ellipse.

In the channel substrate 51, a space R1, a plurality of supply channels Ra, and a plurality of communication channels Na are provided for each of the first row L1 and the second row L2. The space R1 is an elongated opening extending in the Y-axis direction in plan view, viewed in a direction of the Z-axis. Each of the supply channels Ra and each of the communication channels Na are though holes formed for a respective one of the nozzles N. Each supply channel Ra communicates with the space R1.

The pressure chamber substrate 52 is a plate-like member provided with a plurality of pressure chambers C, referred to as cavities, for each of the first row L1 and the second row L2. The plurality of pressure chambers C are aligned in the direction of the Y-axis. Each pressure chamber C, which is formed for a respective one of the nozzles N, is an elongated space extending in the direction of the X-axis as viewed in plan view.

The channel substrate 51 and the pressure chamber substrate 52 are each manufactured, like the nozzle plate 53 described above, for example, by processing a silicon single crystalline substrate by using semiconductor manufacturing technology. However, other known methods and materials may be used as appropriate for manufacture of each of the channel substrate 51 and the pressure chamber substrate 52.

The pressure chamber C is located between the channel substrate 51 and the diaphragm 55. For each of the first row L1 and the second row L2, the plurality of pressure chambers C are aligned in the direction of the Y-axis. In addition, the pressure chamber C communicates with each of the communication channels Na and the supply channel Ra. Accordingly, the pressure chamber C communicates through the communication channel Na with the nozzle N and communicates through the supply channel Ra with the space R1.

On the surface oriented in the Z1 direction of the pressure chamber substrate 52, the diaphragm 55 is disposed. The diaphragm 55 is a plate-like member capable of elastically vibrating. The diaphragm 55 includes, for example, an elastic film formed of silicon dioxide ($SiO_2$) and an insulating film formed of zirconium dioxide ($ZrO_2$), which are stacked in this order in the Z1 direction. The elastic film is formed, for example, by thermally oxidizing one surface of a single crystal silicon substrate. The elastic film is formed, for example, by forming a layer of zirconium by means of sputtering and thermally oxidizing the layer. The diaphragm 55 is not limited to being composed of a stack of the elastic film and the insulating film mentioned above and, for example, may be a single layer or may be composed of three or more layers.

On the surface oriented in the Z1 direction of the diaphragm 55, a plurality of piezoelectric elements 56 respectively corresponding to the nozzles N are arranged for each of the first row L1 and the second row L2. Each piezoelectric element 56 is a passive element that is deformed by the supply of the driving signal Com to cause pressure fluctuations of ink within the pressure chamber C. Each piezoelectric element 56 has an elongated shape extending in the direction of the X-axis as viewed in plan view. The plurality of piezoelectric elements 56 are aligned in the direction of the Y-axis so as to correspond to the plurality of pressure chambers C. The piezoelectric element 56 overlaps the pressure chamber C as viewed in plan view.

Each piezoelectric element 56 includes a first electrode, a piezoelectric element layer, and a second electrode (not illustrated), which are stacked in this order in the Z1 direction. One electrode of the first electrode and the second electrode is an individual electrode. The one electrodes are arranged apart from each other for respective ones of the piezoelectric elements 56. The driving signal Com is supplied to the one electrodes. The other electrode of the first electrode and the second electrode is a band-shaped common electrode extending in the direction of the Y-axis so as to be continuous across the plurality of piezoelectric elements 56. A constant potential, for example, is supplied to the other electrode. Examples of metallic materials of these electrodes include metallic materials such as platinum (Pt), aluminum (Al), nickel (Ni), gold (Au), and copper (Cu). Of these metallic materials, one kind may be used alone, or two or more kinds may be used in combination as an alloy or stacked layers. The piezoelectric element layer is formed of a piezoelectric element material, such as lead zirconate titanate ($Pb(Zr, Ti)O_3$), and has, for example, a band-like shape extending in the direction of the Y-axis continuously across a plurality of piezoelectric elements 56. Here, in the piezoelectric element layer, a through hole passing through the piezoelectric element layer is provided to extend in the direction of the X-axis in an area corresponding to a space between the pressure chambers C adjacent to each other as viewed in plan view. When the diaphragm 55 vibrates in conjunction with the deformation of the piezoelectric element 56 described above, the pressure in the pressure chamber C varies, and thus ink is ejected from the nozzle N. Piezoelectric element layers may be individually provided for the piezoelectric elements 56, respectively.

The protective substrate 57, which is a plate-like member disposed on a surface oriented in the Z1 direction of the diaphragm 55, protects a plurality of piezoelectric elements 56 and reinforces the mechanical strength of the diaphragm 55. Here, a plurality of piezoelectric elements 56 are contained in a space S between the protective substrate 57 and the diaphragm 55. The protective substrate 57 is formed of, for example, a resin material.

The case 58 is a case for storing ink to be supplied to the plurality of pressure chambers C. The case 58 is formed of, for example, a resin material. In the case 58, a space R2 is provided for each of the first row L1 and the second row L2. The space R2 is a space communicating with the space R1 described above and functions, together with the space R1, as a reservoir R for storing ink to be supplied to the plurality of pressure chambers C. The case 58 is provided with introductory openings IO for supplying ink to the reservoirs R. Ink in each reservoir R is supplied via a respective one of the supply channels Ra to the pressure chamber C.

The pressure absorber 54, which is referred to also as a compliance substrate, is a flexible resin film constituting a wall surface of the reservoir R and absorbs pressure fluctuations of ink in the reservoir R. The pressure absorber 54 may be a thin metal plate having a flexibility. The surface oriented in the Z1 direction of the pressure absorber 54 is bonded to the channel substrate 51, for example, by an adhesive.

The wiring substrate 59 is mounted on the surface oriented in the Z1 direction of the diaphragm 55 and is a mounted component for electrically coupling between the control module 120 and the head 151. The wiring substrate 59 is, for example, a flexible wiring substrate of Chip On Film (COF), a flexible printed circuit (FPC), a flexible flat cable (FFC), or the like. The driving circuit 152 described above is mounted on the wiring substrate 59 according to the present embodiment. The wiring substrate 59 may be a rigid substrate. In this case, the driving circuit 152 is mounted on the rigid substrate or a flexible substrate coupled to the rigid substrate.

A4: Details of Driving Circuit

Figure 4:
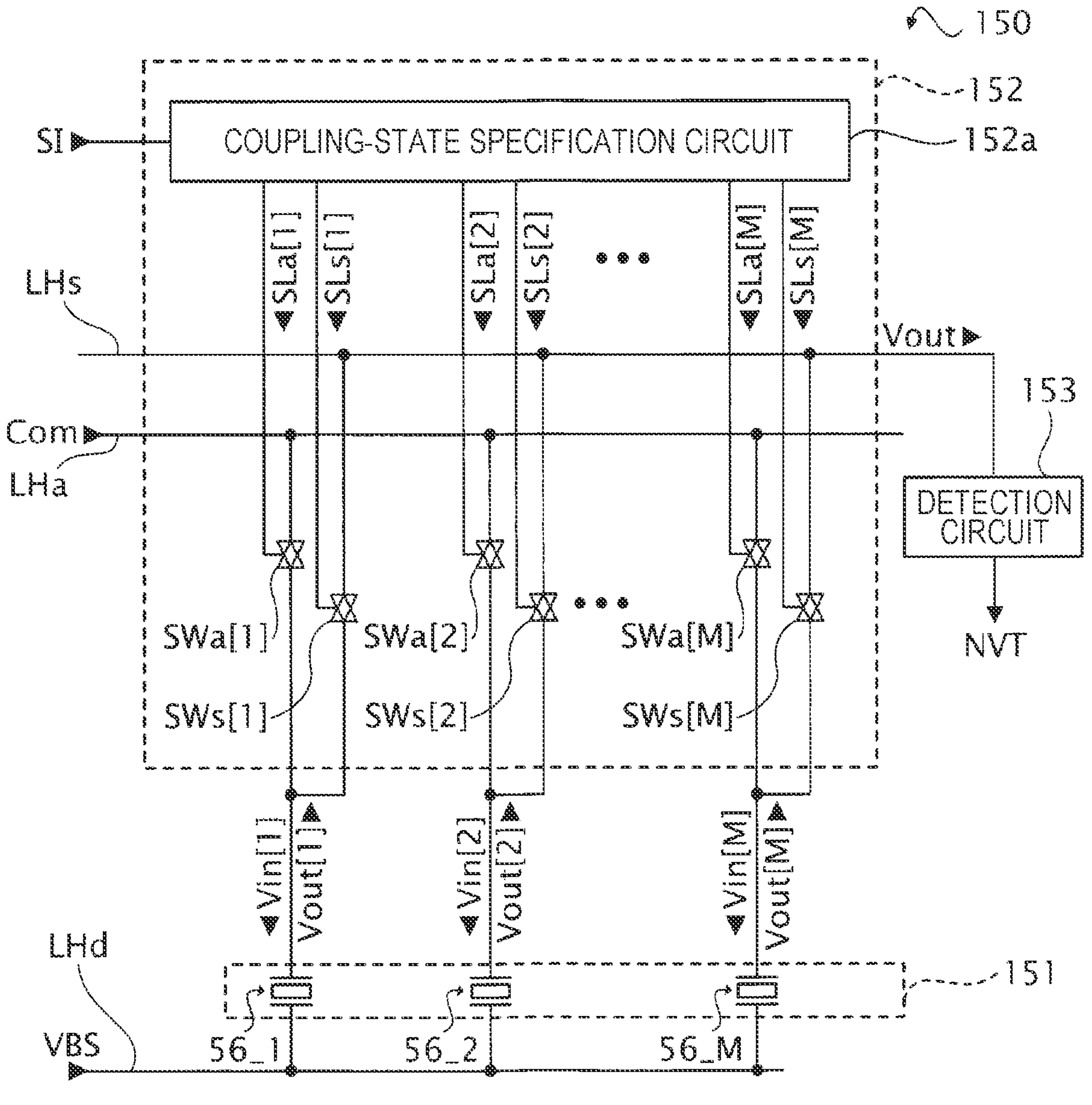
FIG. 4 is a diagram illustrating an exemplary configuration of a driving circuit.

FIG. 4 is a diagram illustrating an exemplary configuration of the driving circuit 152. As illustrated in FIG. 4, wires LHd, LHa, and LHs are coupled to the driving circuit 152. The wire LHd is an electric supply line through which the offset potential VBS is supplied. The wire LHa is a signal line for transmitting the driving signal Com. The wire LHs is a signal line for transmitting the output signal Vout.

The driving circuit 152 includes M switches Swa (SWa[1] to Swa[M]), M switches SWs (SWs[1] to SWs[M]), and a coupling-state specification circuit 152*a* that specifies the coupling states of these switches.

The switch SWa[m] is a switch that switches between electrical continuity (on) and electrical non-continuity (off) between the wire LHa for transmission of the driving signal Com and the piezoelectric element 56[m]. Here, m is a natural number greater than or equal to one and less than or equal to M. The switch SWs[m] is a switch that switches between electrical continuity (on) and electrical non-continuity (off) between the wire LHs for transmission of the output signal Vout and the piezoelectric element 56[m]. Each of these switches is, for example, a transmission gate.

The coupling-state specification circuit 152*a* generates coupling-state specification signals SLa[1] to SLa[M], which specifies on or off of the switches SWa[1] to SWa[M], and the coupling-state specification signal SLs[1] to SLs[M], which specifies on or off of the switches SWs[1] to SWs[M], based on the control signal SI.

In accordance with the coupling-state specification signal SLa[m] generated as described above, the switch SWa[m] is switched on or off. For example, the switch Wa[m] is on when the coupling-state specification signal SLa[m] is at a high level and is off when this signal is at a low level. As described above, the driving circuit 152 supplies the whole or part of the waveform included in the driving signal Com, as the supply driving signal Vin, to one or more piezoelectric elements 56 selected from the piezoelectric elements 56_1 to 56_M.

In addition, in accordance with the coupling-state specification signal SLs[m], the switch SWs[m] is switched on or off. For example, the switch SWs[m] is on when the coupling-state specification signal SLs[m] is at a high level and is off when this signal is at a low level. As described above, the driving circuit 152 supplies the output signal or signals Vout from one or more piezoelectric elements 56 selected from the piezoelectric elements 56_1 to 56_M to the detection circuit 153.

A5: Driving Signal

Figure 5:
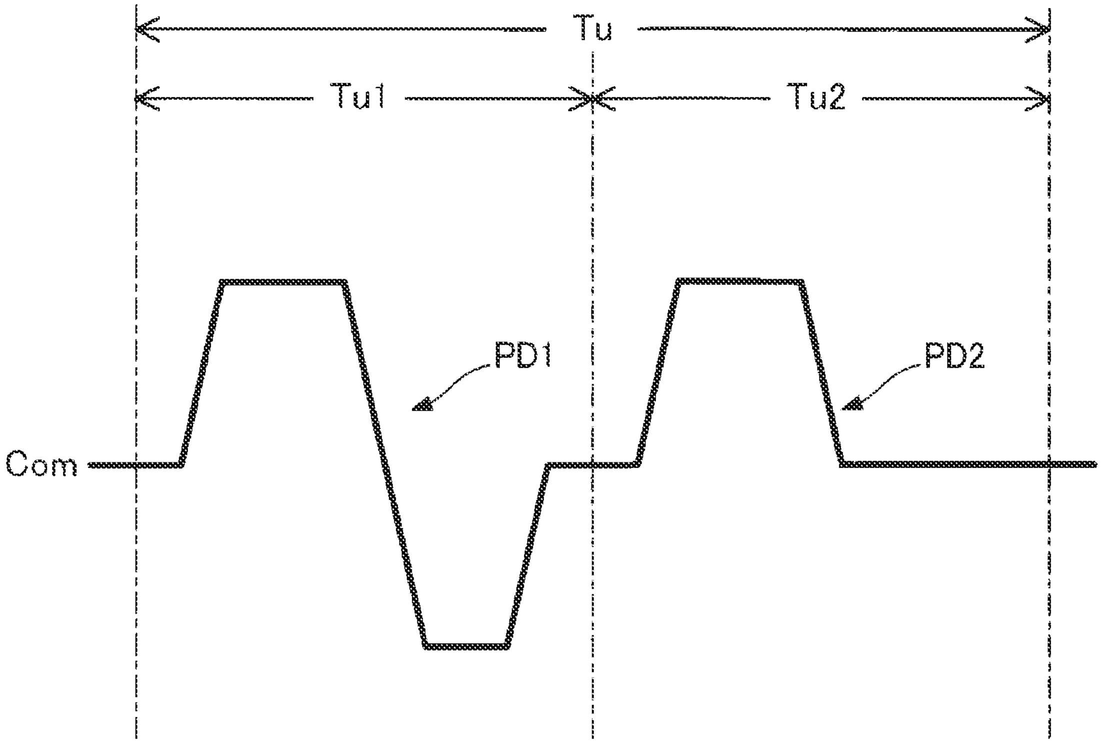
FIG. 5 illustrates an ejection signal and an inspection signal included in a driving signal.

FIG. 5 illustrates the ejection signal PD1 and the inspection signal PD2 included in the driving signal Com. As illustrated in FIG. 5, the driving signal Com including the ejection signal PD1 and the inspection signal PD2 is repeated every unit time period Tu. The unit time period Tu is divided into a preceding time period Tu1 in which the ejection signal PD1 is included and a successive time period Tu2 in which the inspection signal PD2 is included. In the example illustrated in FIG. 5, the time period Tu1 and the time period Tu2 are equal in length to each other. In the present embodiment, each of the time period Tu1 and the time period Tu2 is used as a control period for switching of the switch SWa[m] and the switch SWs[m].

Switching of the switch SWa[m] and the switch SWs[m] may be performed in a control period shorter than the time period Tu1 or the time period Tu2. In addition, the time period Tu1 and the time period Tu2 may differ in length from each other. In addition, although not illustrated in the figure, switching of the switches SWa[ ] to SWa[M] and the switches SWs[2] to SWs[M] is performed in each of the time period Tu1 and the time period Tu2 used as control periods.

The ejection signal PD1 is pulses for ejecting ink from the nozzles N. The ejection signal PD1 is supplied to the piezoelectric element 56, which causes pressure fluctuations of ink within the pressure chamber C so as to eject ink from the nozzles N. In the example illustrated in FIG. 5, the potential of the ejection signal PD1, for which the offset potential VBS is a reference potential, rises to a potential higher than the reference potential and then drops to a potential lower than the reference potential, and thereafter returns to the reference potential. The waveform of the ejection signal PD1 is not limited to the example illustrated in FIG. 5 and may be any waveform, as long as it is sufficient to enable ejection of ink from the nozzles N.

The inspection signal PD2 is pulses for detecting a residual vibration. The inspection signal PD2 is supplied to the piezoelectric element 56, which causes pressure fluctuations of ink within the pressure chamber C without ejecting ink from the nozzles N. In the example illustrated in FIG. 5, the potential of the inspection signal PD2, for which the offset potential VBS is a reference potential, rises to a potential higher than the reference potential and then returns to the reference potential. The waveform of the inspection signal PD2 is not limited to the example illustrated in FIG. 5 and may be any waveform, as long as the waveform is sufficient to enable generation of pressure fluctuations of ink within the pressure chamber C without causing ejection of ink from the nozzles N.

Figure 6:
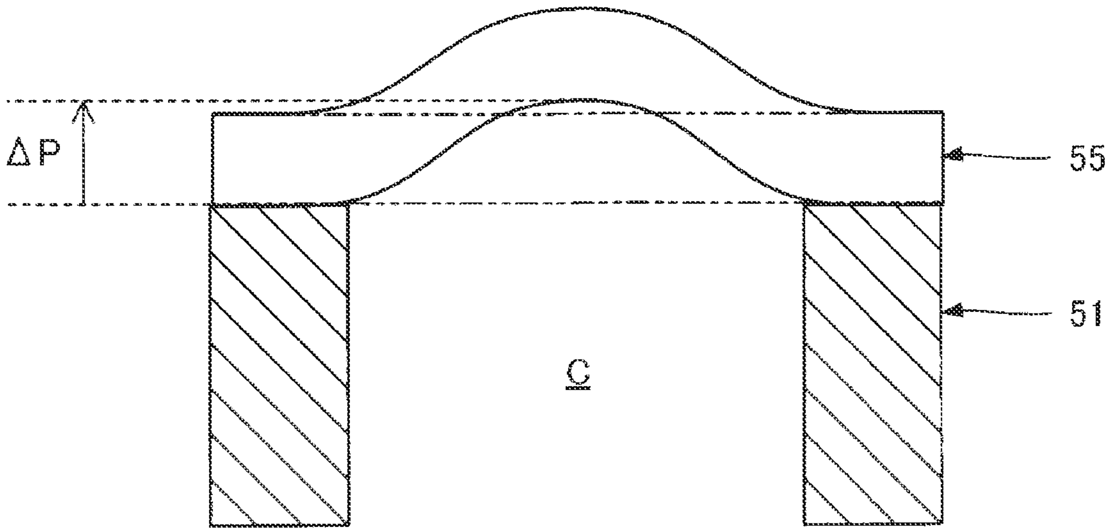
FIG. 6 illustrates the displacement amount of a pressure generating element.

FIG. 6 illustrates the displacement amount of the piezoelectric element 56. In FIG. 6, for convenience of description, the piezoelectric element 56 is not illustrated, the vibrating plate 55 in the case where the inspection signal PD2 is supplied to the piezoelectric element 56 is represented by a solid line, and the vibrating plate 55 in a reference state where neither the ejection signal PD1 nor the inspection signal PD2 is supplied to the piezoelectric element 56 is represented by a dash-dot-dot line. When the inspection signal PD2 is supplied to the piezoelectric element 56, as illustrated in FIG. 6, the vibrating plate 55 is deformed so as to expand the pressure chamber C. At this point, the piezoelectric element 56 is displaced from the reference state by a displacement amount ΔP. However, in the piezoelectric element 56, the piezoelectric properties change as the driving continues. For example, even when the same ejection signal PD1 or inspection signal PD2 is supplied, the displacement amount of the piezoelectric element 56 after the change may be smaller than the displacement amount of the piezoelectric element 56 at the initial time of use. This reduces the amount of an ejected liquid or the flight speed of a droplet. To address this reduction, a property change in the piezoelectric element 56 is determined, and the ejection signal PD1 is corrected or the head 151 is replaced so that the piezoelectric element 56 has the same displacement properties as those at an early stage of use. Thus, printing quality may be maintained.

A6: Method for Driving Liquid Ejecting Apparatus

Figure 7:
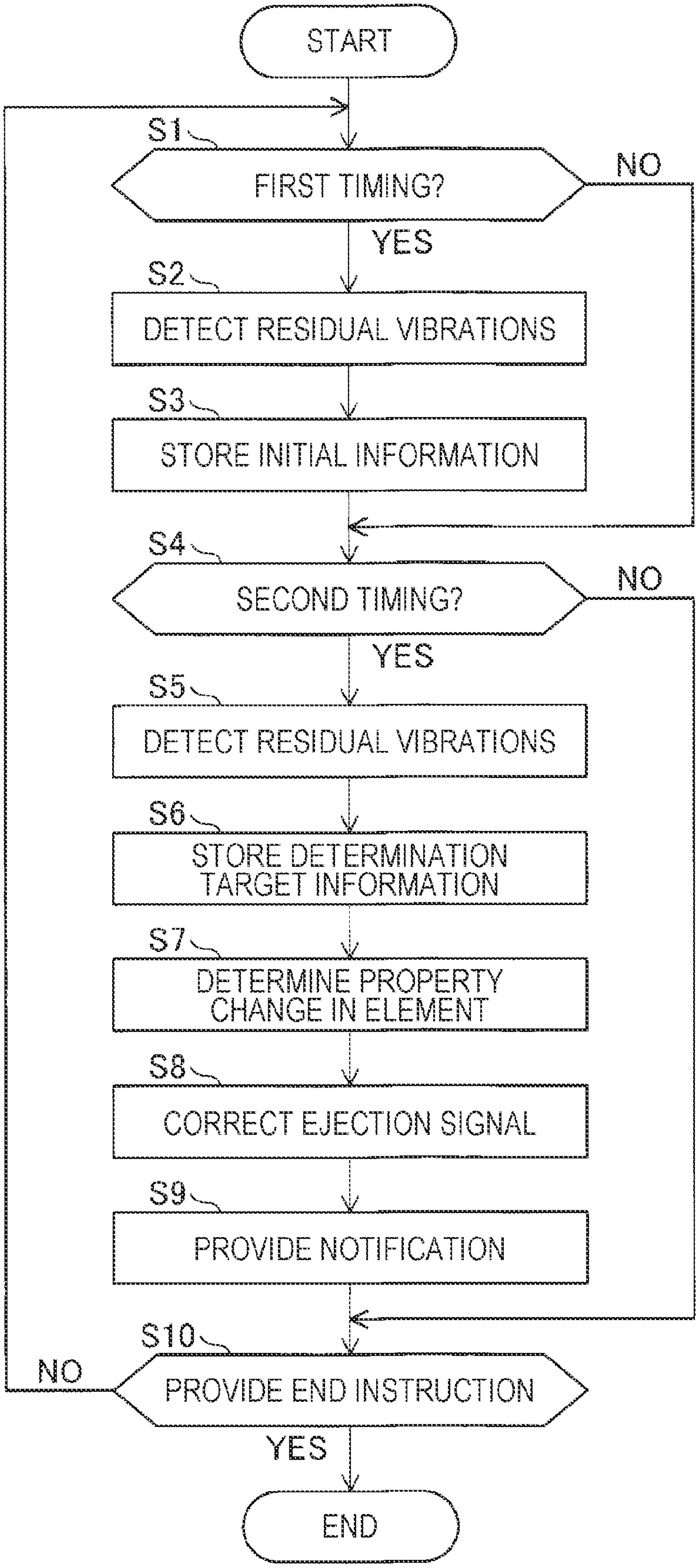
FIG. 7 is a flowchart illustrating a method for driving a liquid ejecting apparatus, according to the first embodiment.

FIG. 7 is a flowchart illustrating a method for driving the liquid ejecting apparatus 100, according to the first embodiment. FIG. 7 illustrates the flow of, among operations of the liquid ejecting apparatus 100, determination operations of determining a property change in the piezoelectric element 56 and operations associated with the determination operations.

In the liquid ejecting apparatus 100, as illustrated in FIG. 7, first, at step S1, the control circuit 121 determines whether the current time is a first timing. For example, the control circuit 121 makes a determination based on whether the initial information NVT1 is stored in the storage circuit 122. If the initial information NVT1 is not stored in the storage circuit 122, the control circuit 121 determines that the current time is the first timing.

At step S1, when the head 151 is replaced, when the determination is the initial operation of the liquid ejecting apparatus 100, or when an instruction based on an input result of an input device (not illustrated) is given, the control circuit 121 may determine that the current time is the first timing. Here, whether the head 151 has been replaced is determined, for example, based on a detection result of a sensor that detects the attachment or detachment of the head 151.

If the current time is the first timing (Yes at step S1), at step S2, the control circuit 121 performs a process of detecting residual vibrations. In the detection process, the inspection signal PD2 is supplied to the target piezoelectric element 56, and accompanying residual vibrations are detected by the detection circuit 153. Through this detection, the vibration information NVT is generated as the initial information NVT1.

After step S2, at step S3, the control circuit 121 causes the vibration information NVT generated by the detection circuit 153 at step S2 to be stored as the initial information NVT1 in the storage circuit 122. The initial information NVT1 is not limited to the case where the vibration information NVT generated by the detection circuit 153 at step S2 is used just as is, and may be, for example, information indicating the amplitude and period of residual vibrations indicated by the vibration information NVT.

After step S3 or if the current time is not the first timing (No at step S1), at step S4, the control circuit 121 determines whether the current time is a second timing. For example, when a predetermined period has elapsed after execution of step S3, the control circuit 121 determines that the current time is the second timing.

At step S4, when an instruction based on an input result of the input device (not illustrated) is given, the control circuit 121 may determine that the current time is the second timing.

If the current time is the second timing (Yes at step S4), at step S5, the control circuit 121 performs a process of detecting residual vibrations. In the detection process, as at step S2 mentioned above, the inspection signal PD2 is supplied to the target piezoelectric element 56, and accompanying residual vibrations are detected by the detection circuit 153. Through this detection, the vibration information NVT is generated as the determination target information NVT2.

After step S5, at step S6, the control circuit 121 causes the vibration information NVT generated by the detection circuit 153 at step S5 to be stored as the determination target information NVT2 in the storage circuit 122. The determination target information NVT2 is not limited to the case where the vibration information NVT generated by the detection circuit 153 at step S5 is used just as is, and may be, for example, information indicating the amplitude and period of residual vibrations indicated by the vibration information NVT.

After step S6, at step S7, the control circuit 121 determines a property change in the piezoelectric element 56 based on the initial information NVT1, the determination target information NVT2, and the correspondence information DC. The determination information Stt is generated by this determination. Details of this determination will be described later with reference to FIGS. 8 to 11.

After step S7, at step S8, the control circuit 121 corrects the ejection signal PD1 based on the determination information Stt. Step S8 may be executed as desired. For example, it may be determined, based on the determination information Stt, whether correction of the ejection signal PD1 is desirable. Only if it is determined that the correction is desirable, step S8 may be executed.

After step S8, at step S9, the control circuit 121 provides a notification of information on a property change in the piezoelectric element 56 based on the determination information Stt. Step S9 may be executed as desired. For example, only when an instruction based on an input result of the input device (not illustrated) is given, step S9 may be executed. In addition, step S9 may be executed between execution of step S7 and execution of step S8.

A7: Determination of Property Change in Pressure Generating Element

Figure 8:
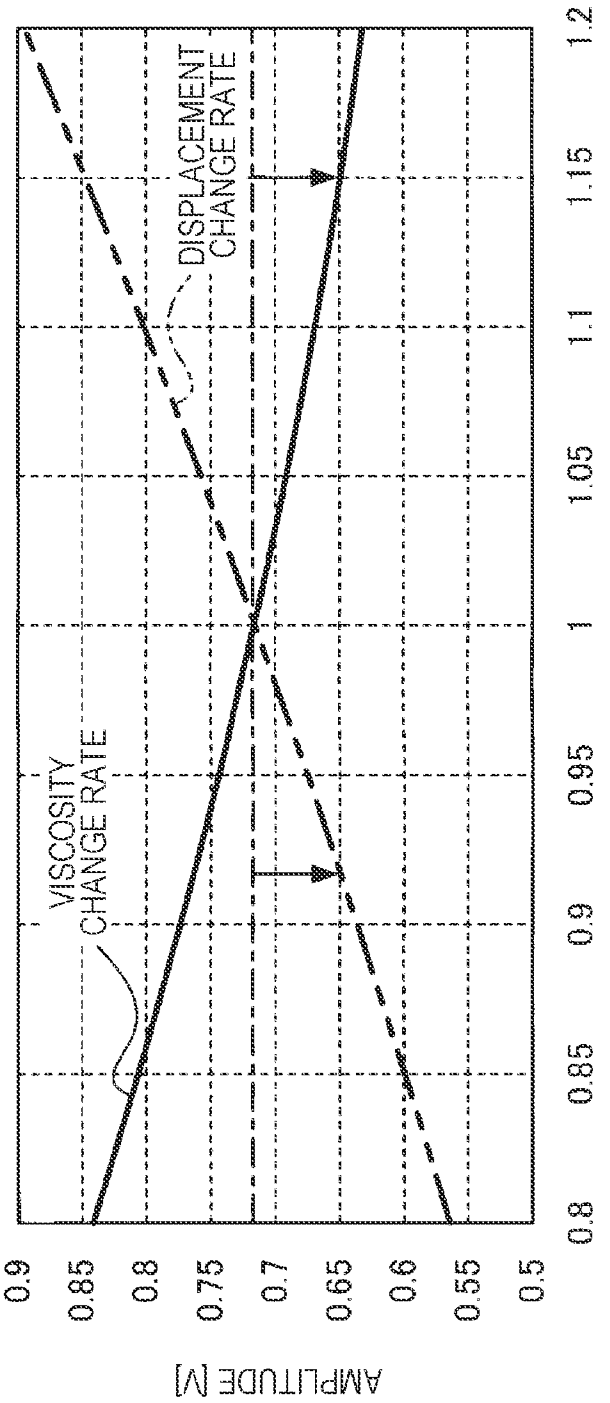
FIG. 8 is a graph illustrating an example of relationships between the amplitude of residual vibrations, and the rate of change in viscosity of a liquid and the rate of change in displacement of a pressure generating element.

FIG. 8 is a graph illustrating an example of relationships between the amplitude of residual vibrations, and the rate of change in viscosity of ink and the rate of change in displacement of the piezoelectric element 56. In FIG. 8, the vertical axis represents the amplitude at a predetermined phase (for example, a first peak phase) of residual vibrations, and the horizontal axis represents the rate of change in viscosity of ink or the rate of change in displacement of the piezoelectric element 56. In FIG. 8, the relationship between the amplitude of residual vibrations and the rate of change in viscosity of ink is indicated by a solid line, and the relationship between the amplitude of residual vibrations and the rate of change in displacement of the piezoelectric element 56 is indicated by a dash-dot-dot line. The rate of change in viscosity of ink is the rate at which the viscosity has changed relative to the initial state. The rate of change in displacement of the piezoelectric element 56 is the rate at which the displacement amount of the piezoelectric element 56 has changed relative to the initial state.

Under the condition where the displacement amount of the piezoelectric element 56 is constant, as indicated by a solid line in FIG. 8, the higher the viscosity of ink, the smaller the amplitude of residual vibrations. In contrast, under the condition where the viscosity of ink is constant, as indicated by a dash-dot-dot line in FIG. 8, the smaller the displacement amount of the piezoelectric element 56, the smaller the amplitude of residual vibrations. In such a manner, the amplitude of residual vibrations decreases with an increase in the viscosity of ink or with a decrease in the displacement amount of the piezoelectric element 56. In other words, the relationship between the amplitude of residual vibrations and the displacement amount of the piezoelectric element 56 changes in accordance with the viscosity of ink.

Accordingly, when the amplitude of residual vibrations changes, for example, only by observing the amplitude at a specific phase of residual vibrations, it is not possible to determine whether a change in the waveform of the residual vibrations is caused by a change in viscosity of ink or by a change in the displacement amount of the piezoelectric element 56. In the example illustrated in FIG. 8, for example, when the amplitude of residual vibrations changes from 0.72 V to 0.65 V, it is not possible to determine whether the displacement amount of the piezoelectric element 56 has decreased by 8% or the viscosity of ink has increased by 15%.

Figure 9:
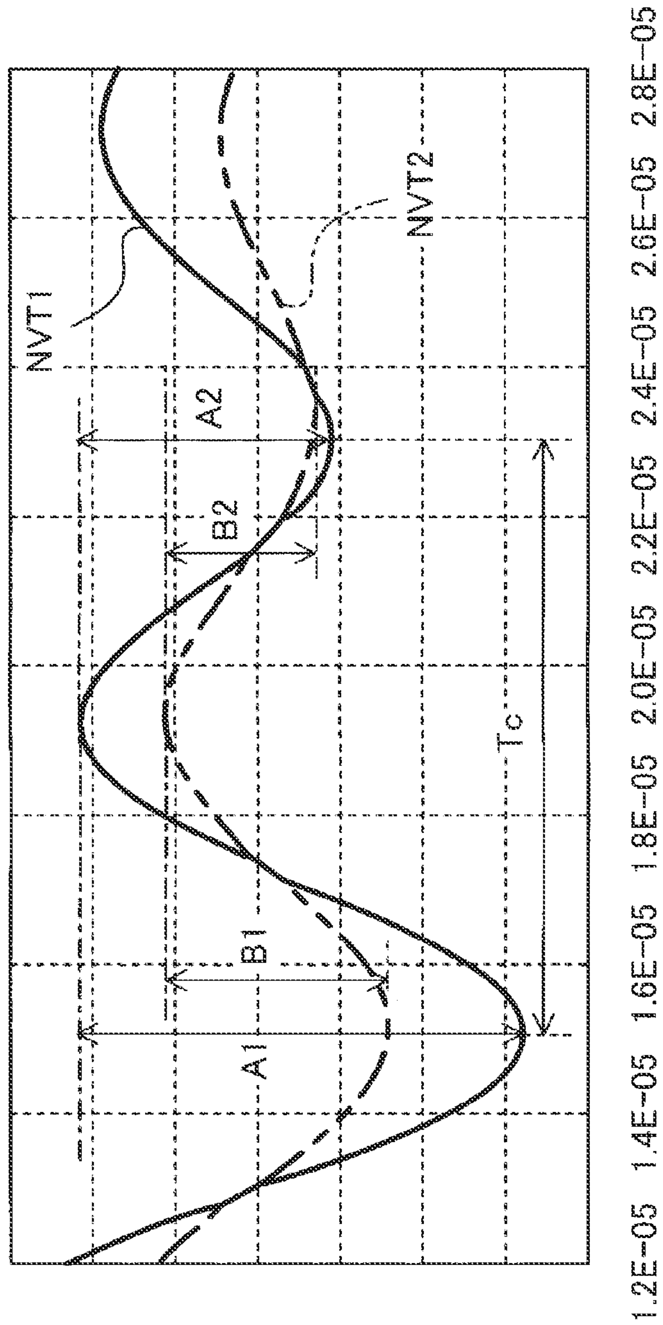
FIG. 9 is graph illustrating an example of waveforms of residual vibrations when the displacement amount of the pressure generating element changes.

FIG. 9 is graph illustrating an example of the waveforms of residual vibrations when the displacement amount of the piezoelectric element 56 changes. In FIG. 9, the vertical axis represents a voltage and the horizontal axis represents time. In FIG. 9, when the viscosity of ink is constant, the waveform of a residual vibration indicated by the initial information NVT1 is represented by a solid line, and the waveform of a residual vibration indicated by the determination target information NVT2 is represented by a dash-dot-dot line.

As illustrated in FIG. 9, the residual vibration indicated by the initial information NVT1 is a damped vibration in which an amplitude A2 is smaller than an amplitude A1. The damping ratio of the residual vibration indicated by the initial information NVT1 is represented by A2/A1. Similarly, the residual vibration indicated by the determination target information NVT2 is a damped vibration in which an amplitude B2 is smaller than an amplitude B1. Here, the amplitude B1 is smaller than the amplitude A1 and the amplitude B2 is smaller than the amplitude A2. The damping ratio of the residual vibration indicated by the determination target information NVT2 is represented by B2/B1.

In this regard, when k is a natural number greater than or equal to one, the amplitude A1 is a difference between a kth extremum and a (k+1)th extremum of the residual vibration indicated by the initial information NVT1. The amplitude A2 is a difference between the (k+1)th extremum and a (k+2)th extremum of the residual vibration indicated by the initial information NVT1. Similarly, the amplitude B1 is a difference between a kth extremum and a (k+1)th extremum of the residual vibration indicated by the determination target information NVT2. The amplitude B2 is a difference between the (k+1)th extremum and a (k+2)th extremum of the residual vibration indicated by the determination target information NVT2.

In the example illustrated in FIG. 9, the amplitude A1 is a difference between a first extremum (a first local minimum) and a second extremum (a first local maximum) of the residual vibration indicated by the initial information NVT1. The amplitude A2 is a difference between the second extremum (the first local maximum) and a third extremum (a second local minimum) of the residual vibration indicated by the initial information NVT1. Similarly, the amplitude B1 is a difference between a first extremum (a first local minimum) and a second extremum (a first local maximum) of the residual vibration indicated by the determination target information NVT2. The amplitude B2 is a difference between the first extremum (the first local maximum) and a third extremum (a second local minimum) of the residual vibration indicated by the determination target information NVT2.

In such a manner, when the displacement amount of the piezoelectric element 56 changes under the condition where the viscosity of ink is constant, the damping ratio (B2/B1) of the residual vibration indicated by the determination target information NVT2 is equal to the damping ratio (A2/A1) of the residual vibration indicated by the initial information NVT1. That is, when the displacement amount of the piezoelectric element 56 changes under the condition where the viscosity of ink is constant, the damping ratio of a residual vibration does not change.

In addition, when the displacement amount of the piezoelectric element 56 changes under the condition where the viscosity of ink is constant, a period Tc of the residual vibration indicated by the determination target information NVT2 is equal to the period Tc of the residual vibration indicated by the initial information NVT1. That is, when the displacement amount of the piezoelectric element 56 changes under the condition where the viscosity of ink is constant, the period Tc of a residual vibration does not change. In FIG. 9, the period Tc of the residual vibration indicated by the initial information NVT1 is representatively illustrated.

Figure 10:
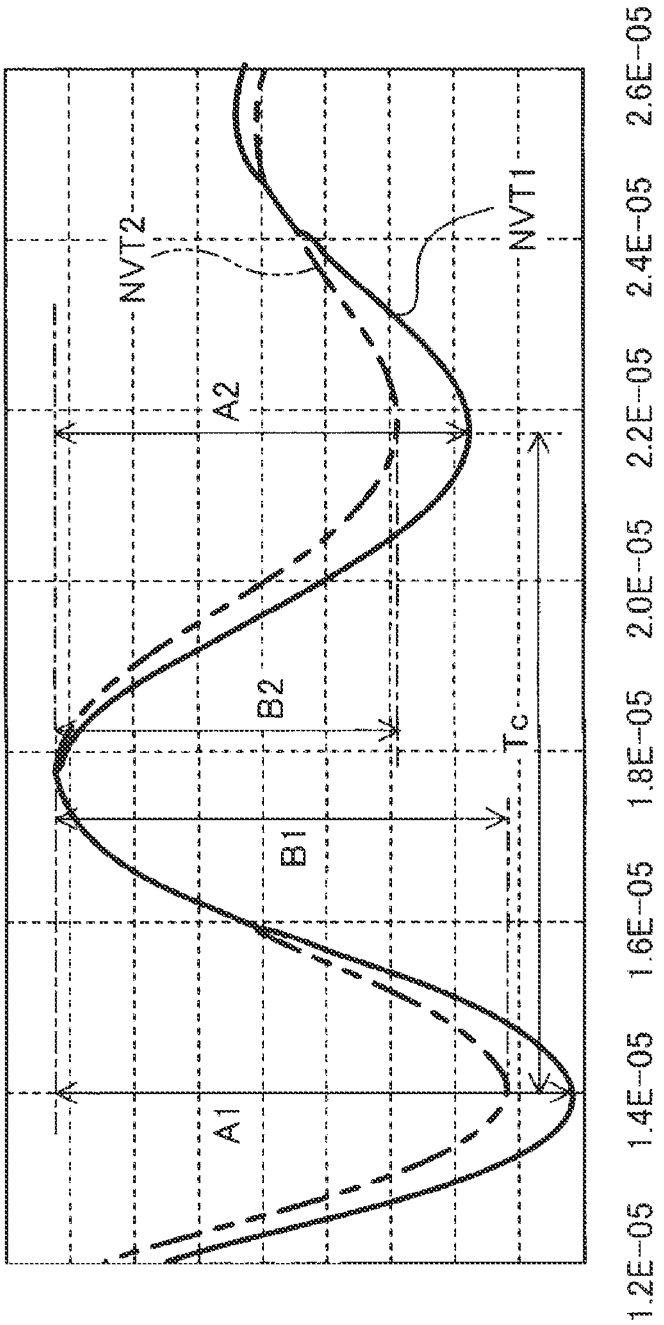
FIG. 10 is graph illustrating an example of waveforms of residual vibrations when the viscosity of a liquid changes.

FIG. 10 is graph illustrating an example of the waveforms of residual vibrations when the viscosity of ink changes. In FIG. 10, the vertical axis represents a voltage and the horizontal axis represents time. In FIG. 10, when the displacement amount of the piezoelectric element 56 is constant, the waveform of the residual vibration indicated by the initial information NVT1 is represented by a solid line, and the waveform of the residual vibration indicated by the determination target information NVT2 is represented by a dash-dot-dot line.

When the viscosity of ink increases, as illustrated in FIG. 10, the damping ratio (B2/B1) of the residual vibration indicated by the determination target information NVT2 is larger than the damping ratio (A2/A1) of the residual vibration indicated by the initial information NVT1. That is, when the viscosity of ink increases, the damping ratio of the residual vibration increases regardless of whether the displacement amount of the piezoelectric element 56 changes.

Accordingly, the change in viscosity of ink may be estimated based on the damping ratio (B2/B1). That is, the relationship between the damping ratio (B2/B1) and the viscosity of ink is determined in advance. By using this relationship, the viscosity of ink may be calculated from the damping ratio (B2/B1).

In addition, when the viscosity of ink increases, the period Tc of the residual vibration indicated by the determination target information NVT2 is larger than the period Tc of the residual vibration indicated by the initial information NVT1. That is, when the viscosity of ink increases, the period Tc of the residual vibration increases regardless of whether the displacement amount of the piezoelectric element 56 changes. Accordingly, the change in viscosity of ink may be estimated based on the period Tc. In FIG. 10, the period Tc of the residual vibration indicated by the initial information NVT1 is representatively illustrated.

Since the correspondence between the amplitude of residual vibrations and the displacement amount of the piezoelectric element 56 changes in accordance with the viscosity of ink as described above, information indicating the correspondence for each viscosity of ink is prepared in advance as the correspondence information DC. Thereby, the displacement amount of the piezoelectric element 56 may be estimated with a high accuracy based on the estimated viscosity of ink, the correspondence information DC, and the vibration information NVT as described above.

Accordingly, at step S7 illustrated in FIG. 7 described above, the displacement amount of the piezoelectric element 56 is estimated in such a manner, and a property change in the piezoelectric element 56 is determined by using an estimated result.

Figure 11:
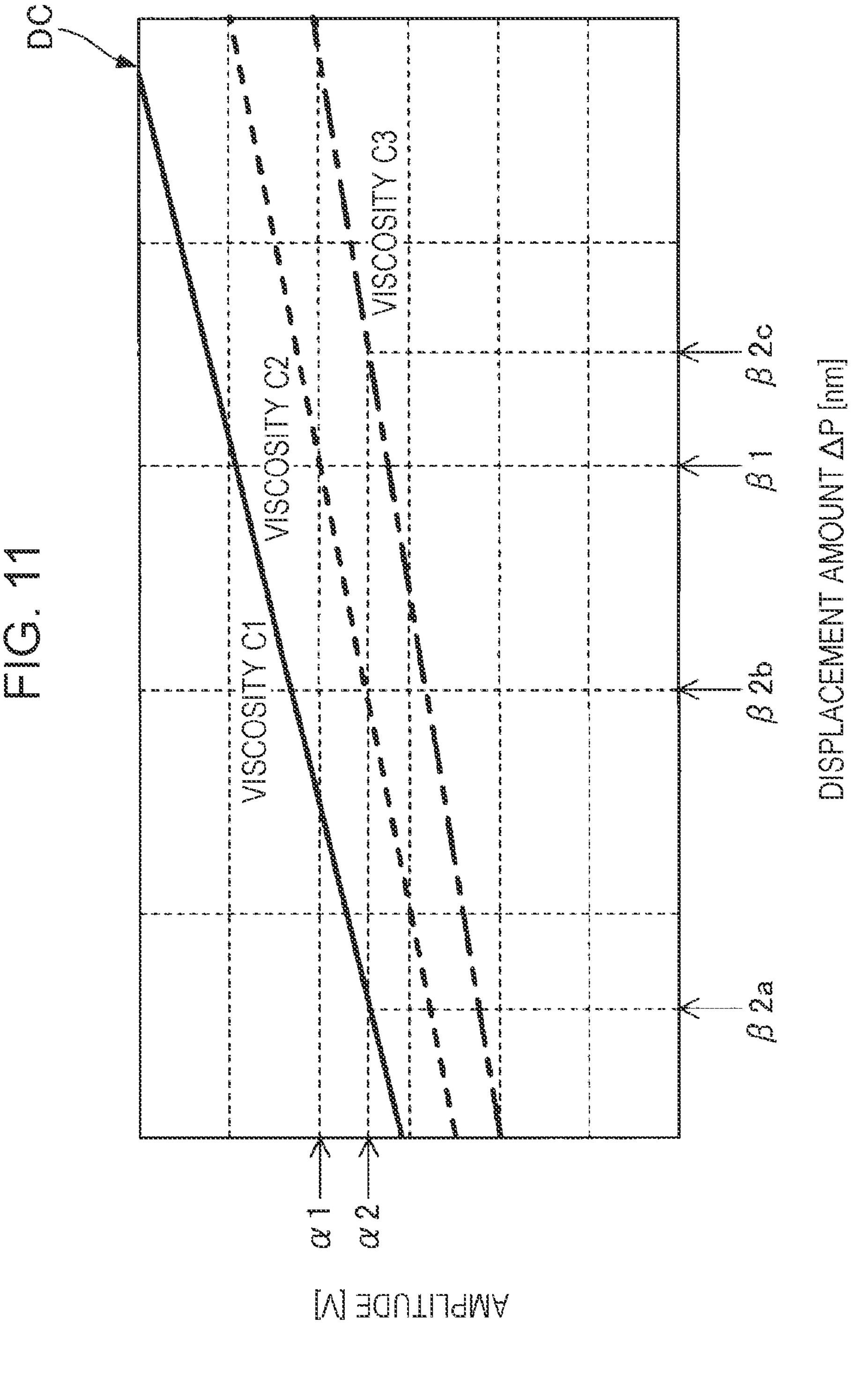
FIG. 11 is a diagram illustrating correspondence information in the first embodiment.

FIG. 11 is a diagram illustrating the correspondence information DC in the first embodiment. FIG. 11 illustrates a graph representing, for each viscosity of ink, an exemplary correspondence between the amplitude of residual vibrations and the displacement amount of the piezoelectric element 56. In FIG. 11, the vertical axis represents the amplitude [V] at a predetermined phase (for example, a first peak phase) of residual vibrations, and the horizontal axis represents the displacement amount ΔP [nm] of the piezoelectric element 56. In FIG. 11, the solid line indicates the relationship between the amplitude of residual vibrations and the displacement amount ΔP of the piezoelectric element 56 when the viscosity of ink is C1, the dashed line indicates the relationship between the amplitude of residual vibrations and the displacement amount ΔP of the piezoelectric element 56 when the viscosity of ink is C2, and the dash-dot line indicates the relationship between the amplitude of residual vibrations and the displacement amount ΔP of the piezoelectric element 56 when the viscosity of ink is C3. The viscosities C1, C2, and C3 satisfy the relationship of C1<C2<C3.

The correspondence information DC, as illustrated in FIG. 11, is information that indicates, using a table or an arithmetic expression, for each viscosity of ink within the pressure chamber C, the correspondence between the amplitude of residual vibrations and the displacement amount of the piezoelectric element 56. At step S7 illustrated in FIG. 7 described above, the control circuit 121 estimates the viscosity of ink at the first timing using the calculation methods described above, and then estimates the displacement amount of the piezoelectric element 56 at the first timing based on a result of the viscosity estimation, the correspondence information DC, and the initial information NVT1. Similarly, at step S7 illustrated in FIG. 7 described above, the control circuit 121 estimates the viscosity of ink at the second timing using the calculation methods described above, and then estimates the displacement amount of the piezoelectric element 56 at the second timing based on a result of the viscosity estimation, the correspondence information DC, and the determination target information NVT2.

In the example illustrated in FIG. 11, in estimating the displacement amount of the piezoelectric element 56, the relationship between the amplitude of residual vibrations and the displacement amount of the piezoelectric element 56 for a viscosity that is, among the viscosities C1, C2, and C3, closest to a result obtained by calculating the viscosity of ink is used.

As described above, at step S7 illustrated in FIG. 7 described above, after the displacement amount of the piezoelectric element 56 at the first timing and the displacement amount of the piezoelectric element 56 at the second timing have been estimated, the determination information Stt is generated based on the difference or rate between these displacement amounts.

As described above, the liquid ejecting apparatus 100 includes the head 151, the driving signal generation circuit 124, which is an exemplary signal generator, the detection circuit 153, which is an exemplary detector, the storage circuit 122, which is an exemplary storage, and the determiner 121*a*.

Turning now to the above description, the head 151 includes the nozzles N that eject ink, which is an exemplary liquid, the pressure chambers C communicating with the nozzles N, and the piezoelectric elements 56, which are exemplary pressure generating elements that generate pressure fluctuations in ink within the pressure chambers C. The driving signal generation circuit 124 generates the inspection signal PD2, which causes pressure fluctuations of ink within the pressure chamber C by being supplied to the piezoelectric element 56. The detection circuit 153 detects residual vibrations that occur in the pressure chamber C when the inspection signal PD2 is supplied to the piezoelectric element 56. The storage circuit 122 stores the initial information NVT1 on the residual vibrations, which are detected by the detection circuit 153 when the inspection signal PD2 is supplied at the first timing to the piezoelectric element 56, the determination target information NVT2 on the residual vibrations, which are detected by the detection circuit 153 when the inspection signal PD2 is supplied at the second timing later than the first timing to the piezoelectric element 56, and the correspondence information DC on, for each viscosity of ink within the pressure chamber C, the correspondence between the amplitude of residual vibrations and the displacement amount ΔP of the piezoelectric element 56. The determiner 121*a* determines a property change in the piezoelectric element 56 based on the initial information NVT1, the determination target information NVT2, and the correspondence information DC.

With the liquid ejecting apparatus 100 described above, a driving method capable of determining a property change in the piezoelectric element 56 with a high accuracy may be implemented.

The method for driving the liquid ejecting apparatus 100 according to the present embodiment includes, as described above, storing the initial information NVT1, storing the determination target information NVT2, and determining a property change in the piezoelectric element 56 based on the initial information NVT1, the determination target information NVT2, and the correspondence information DC.

In the method for driving the liquid ejecting apparatus 100 described above, by using, in addition to the initial information NVT1 and the determination target information NVT2, the correspondence information DC on, for each viscosity of ink within the pressure chamber C, the correspondence between the amplitude of residual vibrations and the displacement amount ΔP of the piezoelectric element 56, the displacement amount of the piezoelectric element 56 may be estimated with a high accuracy even if the viscosity of ink changes. As a result, the property change in the piezoelectric element 56 may be determined with a high accuracy.

In the method for driving the liquid ejecting apparatus 100 according to the present embodiment, as described above, the viscosity of ink within the pressure chamber C at the second timing is estimated based on the damping ratio (B2/B1) of the residual vibration indicated by the determination target information NVT2, the displacement amount of the piezoelectric element 56 at the second timing is estimated based on the estimated viscosity, the determination target information NVT2, and the correspondence information DC, and a property change in the piezoelectric element 56 is determined based on the estimated displacement amount and the initial information NVT1.

The damping ratio of a residual vibration does not change with a property change in the piezoelectric element 56 but changes in accordance with a change in viscosity of ink within the pressure chamber C. Accordingly, the viscosity of ink within the pressure chamber C at the second timing may be estimated based on the damping ratio (B2/B1) of the residual vibration indicated by the determination target information NVT2. Applying the viscosity estimated in such a manner and the determination target information NVT2 to the correspondence information DC enables the displacement amount of the piezoelectric element 56 at the second timing to be estimated with a high accuracy. Then, comparison between the estimated displacement amount and the displacement amount based on the initial information NVT1 enables a property change in the piezoelectric element 56 to be determined with a high accuracy.

In the method for driving the liquid ejecting apparatus 100 according to the present embodiment, the viscosity of ink within the pressure chamber C at the second timing may be estimated based on the period of the residual vibration indicated by the determination target information NVT2. The period Tc of the residual vibration does not change with a property change in the piezoelectric element 56 but changes with a change in viscosity of ink within the pressure chamber C. Accordingly, the viscosity of ink within the pressure chamber C at the second timing may be estimated based on the period Tc of the residual vibration indicated by the determination target information NVT2. Applying the viscosity estimated in such a manner and the determination target information NVT2 to the correspondence information DC enables the displacement amount of the piezoelectric element 56 at the second timing to be estimated with a high accuracy. Then, comparison between the estimated displacement amount and the displacement amount based on the initial information NVT1 enables a property change in the piezoelectric element 56 to be determined with a high accuracy.

In addition, according to the present embodiment, as described above, the driving signal generation circuit 124 generates, in addition to the inspection signal PD2, the ejection signal PD1 that is supplied to the piezoelectric element 56 to cause ink to be ejected from the nozzle N. Then, in the method for driving the liquid ejecting apparatus 100 according to the present embodiment, the ejection signal PD1 is corrected based on a determined property change in the piezoelectric element 56. Therefore, even if a property change in the piezoelectric element 56 occurs, a desirable ejection characteristic may be obtained.

Furthermore, in the method for driving the liquid ejecting apparatus 100 according to the present embodiment includes, as described above, notification is provided of information on a property change in the piezoelectric element 56 based on the determined property change in the piezoelectric element 56. Therefore, depending on the degree of a property change in the piezoelectric element 56, the user may be prompted to replace the head 151 or be notified of a predicted time for replacement of the head 151.

In addition, as described above, the correspondence information DC according to the present embodiment is information that indicates, using a table or an arithmetic expression, for each viscosity of ink within the pressure chamber C, the correspondence between the amplitude of residual vibrations and the displacement amount of the piezoelectric element 56. Therefore, the calculation amount desired for determination may be reduced relative to that for determination using a simulation.

B: Second Embodiment

A second embodiment of the present disclosure will be described below. In the embodiment illustrated below, elements with operations and functions similar to those in the first embodiment are denoted by reference numerals borrowed from the description in the first embodiment, and detailed description of each of the elements is not described as appropriate.

Figure 12:
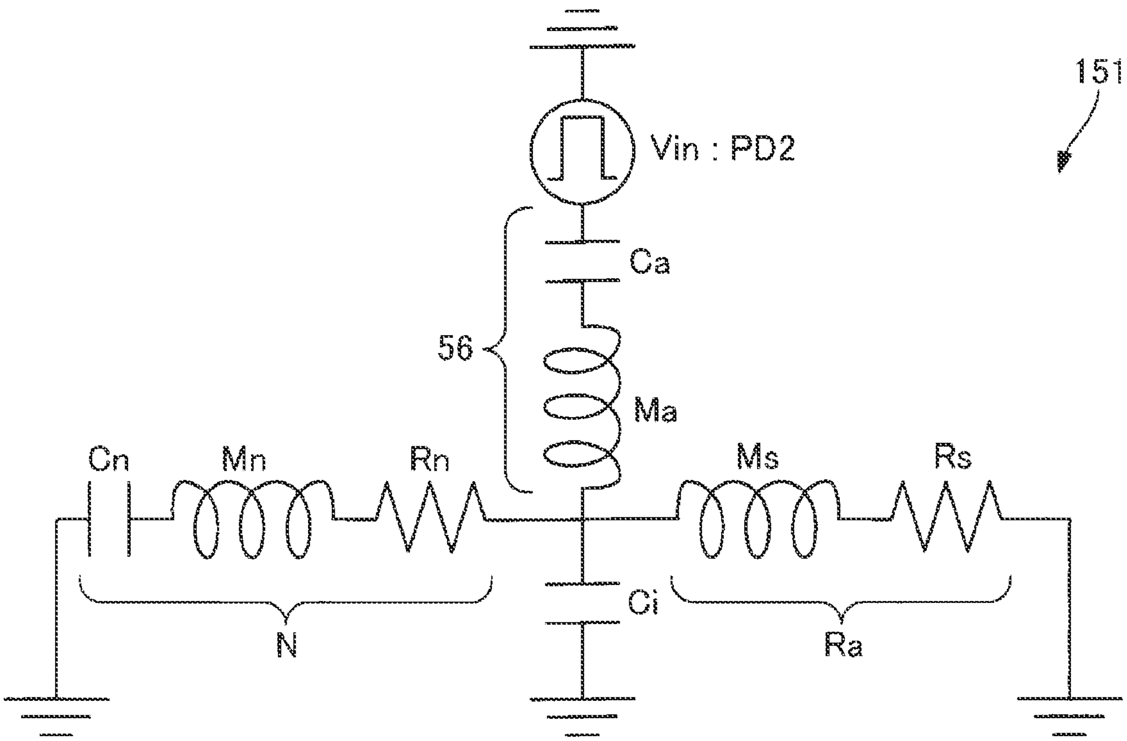
FIG. 12 is a diagram illustrating an equivalent circuit of a head as a lumped-element model.

FIG. 12 is a diagram illustrating an equivalent circuit of the head 151 as a lumped-element model. As illustrated in FIG. 12, the head 151 is illustrated in a simplified manner as a lumped-element model of an equivalent circuit, in which the piezoelectric element 56 is represented by compliance Ca and inertance Ma, the nozzle N is represented by compliance Cn, inertance Mn, and resistance Rn, and the supply channel Ra is represented by inertance Ms and resistance Rs. Here, the compressibility of ink within the head 151 is represented by compliance Ci.

Here, the inertance Mn is defined by the size of the nozzle N and the specific gravity of ink. The inertance Ms is defined by the size of the supply channel Ra and the specific gravity of ink. The resistance Rn is defined by the size of the nozzle N and the viscosity of ink. The resistance Rs is defined by the size of the supply channel Ra and the viscosity of ink. The compliance Cn is defined by the size of the nozzle N and the surface tension of ink. The compliance Ci is defined by the volume of the communication channel Na and the volume compressibility of ink. The compliance Ca and the inertance Ma are defined by the size, elastic modulus, specific gravity, and so on of the piezoelectric element 56.

The amplitude of residual vibrations is proportional to pressure fluctuations of ink within the pressure chamber C. Accordingly, the amplitude of residual vibrations may be estimated by a simulation using the lumped-element model mentioned above.

Figure 13:
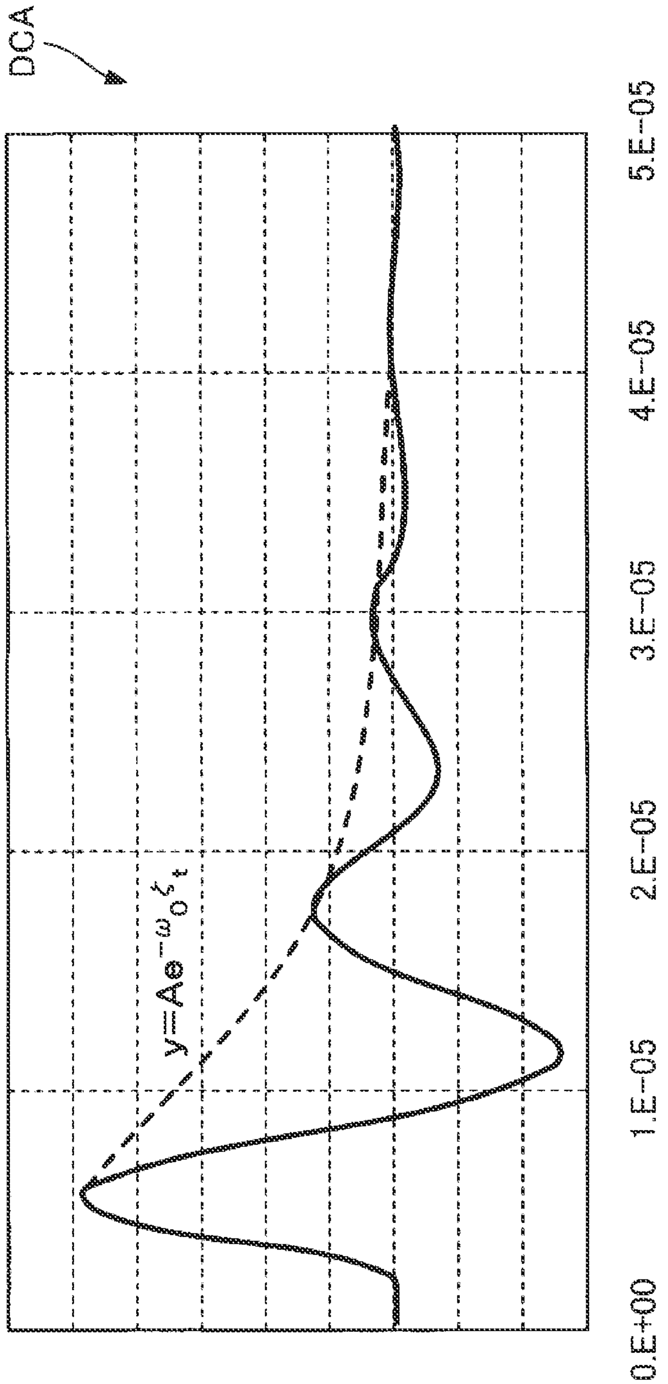
FIG. 13 is a diagram illustrating correspondence information in a second embodiment.

FIG. 13 is a diagram illustrating correspondence information DCA according to the second embodiment. The correspondence information DCA according to the present embodiment is a program that, by using a simulation with the lumped-element model, calculates, for each viscosity of ink within the pressure chamber C, the correspondence between the amplitude of residual vibrations and the displacement amount of the piezoelectric element 56.

In FIG. 13, the waveform of residual vibrations obtained by the simulation using the lumped-element model mentioned above is indicated by a solid line. By fitting the waveform using $y=Ae^{-\omega_0 \zeta t}$ as indicated by a dashed line in FIG. 13, a damping ratio of a residual vibration is determined, and then the viscosity of ink is calculated using the relationship of $R=2\zeta\sqrt{(M/C)}$.

Here, assuming that the channel sizes in the head 151 are constant and that there is no change in fluid properties other than the viscosity of ink, $\omega_0$ is an angular frequency when the viscosity is zero, y is a displacement, and A is an initial displacement. R is a viscous resistance defined as a constant proportional to a product of the viscosity of ink and a channel size. M is inertance and C is compliance.

As described above, the relationship between the amplitude of residual vibrations and the viscosity of ink may be calculated. Accordingly, information indicating the correspondence between the amplitude of residual vibrations and the displacement amount of the piezoelectric element 56 at a specific viscosity of ink is prepared in advance. Thereby, using this information and a result obtained by calculating the relationship between the amplitude of residual vibrations indicated by the determination target information NVT2 and the viscosity of ink, the correspondence between the amplitude of residual vibrations and the displacement amount of the piezoelectric element 56 at the viscosity of ink at the second timing may be calculated.

According to the second embodiment described above, the property change in the piezoelectric element 56 may be determined with a high accuracy. In the present embodiment, as described above, the correspondence information DCA is a program for calculating, using a simulation with the lumped-element model, for each viscosity of ink within the pressure chamber C, the correspondence between the amplitude of residual vibrations and the displacement amount of the piezoelectric element 56. Therefore, even when the extent to which the viscosity of ink changes is great, the displacement amount of the piezoelectric element 56 may be estimated with a high accuracy.

C: Modifications

Each form illustrated above may be modified in a variety of ways. Aspects of specific modifications applicable to the forms described above will be illustrated by way of example below. Aspects selected arbitrarily from the illustrations given below may be combined as appropriate to the extent that they are not inconsistent with each other.

C1: First Modification

In the forms described above, an aspect in which residual vibrations are detected using the inspection signal PD2 is illustrated. However, detection of residual vibrations is not limited to this aspect and may be performed using the ejection signal PD1. That is, the ejection signal PD1 may double as an inspection signal.

C2: Second Modification

In the forms described above, an aspect in which the ejection signal PD1 and the inspection signal PD2 are transmitted through a single signal line is illustrated. However, transmission of the ejection signal PD1 and the inspection signal PD2 is not limited to this aspect and may be performed using individual signal lines. In addition, the driving signal Com may include a signal or pulse other than the ejection signal PD1 and the inspection signal PD2.

C3: Third Modification

In the forms described above, the liquid ejecting apparatus 100 of a serial type is illustrated in which the transport member 141 on which the head 151 is mounted is moved forwards and backwards. However, the present disclosure is also applied to a liquid ejecting apparatus of a line type in which a plurality of nozzles N are distributed across the entire width of the medium M.

C4: Fourth Modification

The liquid ejecting apparatus 100 illustrated in the forms described above may be employed not only for a device exclusively used for printing but also for various types of devices such as a facsimile device and a copier. The applications of the present disclosure are non-limiting. Understandably, the applications of a liquid ejecting apparatus are not limited to printing. For example, a liquid ejecting apparatus that ejects a solution of a coloring material is used as a manufacturing apparatus of forming a color filter of a display device, such as a liquid crystal display panel. In addition, a liquid ejecting apparatus that spouts a solution of a conductive material is used as a manufacturing apparatus of forming wiring and electrodes of a wiring substrate. In addition, a liquid ejecting apparatus that ejects a solution of an organic matter regarding a living body is used as a manufacturing apparatus that manufactures, for example, biochips.

What is claimed is:

1. A method for driving a liquid ejecting apparatus including a head and a signal generator, the head including a nozzle configured to eject a liquid, a pressure chamber communicating with the nozzle, and a pressure generating element configured to generate a pressure fluctuation in a liquid within the pressure chamber, the signal generator being configured to generate an inspection signal that causes a pressure fluctuation of the liquid within the pressure chamber by being supplied to the pressure generating element, the method comprising:

storing initial information on a residual vibration that occurs in the pressure chamber when the inspection signal is supplied at a first timing to the pressure generating element;

storing determination target information on a residual vibration that occurs in the pressure chamber when the inspection signal is supplied at a second timing later than the first timing to the pressure generating element;

estimating a viscosity of the liquid in the pressure chamber at the second timing based on a damping ratio of the residual vibration indicated by the determination target information or based on a period of the residual vibration indicated by the determination target information, estimating a displacement amount of the pressure generating element at the second timing based on the estimated viscosity, the determination target information, and a correspondence information on, for each viscosity of the liquid in the pressure chamber, a correspondence between an amplitude of a residual vibration and a displacement amount of the pressure generating element, and determining a property change in the pressure generating element based on the estimated displacement amount and the initial information.

2. The method according to claim 1, wherein the signal generator generates, in addition to the inspection signal, an ejection signal for ejecting a liquid from the nozzle by being supplied to the pressure generating element, the method further comprising:

correcting the ejection signal based on the property change in the pressure generating element.

3. The method according to claim 1, further comprising:

providing a notification of information on the property change in the pressure generating element based on the determined property change in the pressure generating element.

4. The method according to claim 1, wherein the correspondence information is information that indicates, using a table or an arithmetic expression, for each viscosity of the liquid within the pressure chamber, the correspondence between the amplitude of the residual vibration and the displacement amount of the pressure generating element.

5. The method according to claim 1, wherein the correspondence information is a program that, by using a simulation with a lumped-element model, calculates, for each viscosity of the liquid within the pressure chamber, the correspondence between the amplitude of the residual vibration and the displacement amount of the pressure generating element.

6. A liquid ejecting apparatus comprising:

a head including a nozzle configured to eject a liquid, a pressure chamber communicating with the nozzle, and a pressure generating element configured to generate a pressure fluctuation in a liquid within the pressure chamber;

a signal generator configured to generate an inspection signal that causes a pressure fluctuation of the liquid within the pressure chamber by being supplied to the pressure generating element;

a detector configured to detect a residual vibration that occurs in the pressure chamber when the inspection signal is supplied to the pressure generating element;

a storage storing initial information on the residual vibration that is detected by the detector when the inspection signal is supplied at a first timing to the pressure generating element, determination target information on the residual vibration that is detected by the detector when the inspection signal is supplied at a second timing later than the first timing to the pressure generating element, and correspondence information on, for each viscosity of a liquid within the pressure chamber, a correspondence between an amplitude of a residual vibration and a displacement amount of the pressure generating element; and a determiner configured to:

estimate a viscosity of the liquid in the pressure chamber at the second timing based on a damping ratio of the residual vibration indicated by the determination target information or based on a period of the residual vibration indicated by the determination target information, estimate a displacement amount of the pressure generating element at the second timing based on the estimated viscosity, the determination target information, and a correspondence information on, for each viscosity of the liquid in the pressure chamber, a correspondence between an amplitude of a residual vibration and a displacement amount of the pressure generating element, and determine a property change in the pressure generating element based on the estimated displacement amount and the initial information.

7. A method for driving a liquid ejecting apparatus including a head and a signal generator, the head including a nozzle configured to eject a liquid, a pressure chamber communicating with the nozzle, and a pressure generating element configured to generate a pressure fluctuation in a liquid within the pressure chamber, the signal generator being configured to generate an inspection signal that causes a pressure fluctuation of the liquid within the pressure chamber by being supplied to the pressure generating element, the method comprising:

storing initial information on a residual vibration that occurs in the pressure chamber when the inspection signal is supplied at a first timing to the pressure generating element;

storing determination target information on a residual vibration that occurs in the pressure chamber when the inspection signal is supplied at a second timing later than the first timing to the pressure generating element;

estimating a viscosity of the liquid in the pressure chamber at the first timing based on the initial information;

estimating a viscosity of the liquid in the pressure chamber at the second timing based on the determination target information;

estimating a displacement amount of the pressure generating element at the first timing based on an amplitude of the residual vibration indicated by the initial information, the viscosity of the liquid in the pressure chamber at the first timing, and correspondence information on, for each viscosity of the liquid in the pressure chamber, a correspondence between an amplitude of a residual vibration and a displacement amount of the pressure generating element;

estimating a displacement amount of the pressure generating element at the second timing based on an amplitude of the residual vibration indicated by the determination target information, the viscosity of the liquid in the pressure chamber at the second timing, and the correspondence information; and determining a property change in the pressure generating element based on the displacement amount of the pressure generating element at the first timing and the displacement amount of the pressure generating element at the second timing.

8. The method according to claim 7, wherein a viscosity of the liquid in the pressure chamber at the second timing is estimated based on a damping ratio of the residual vibration indicated by the determination target information, and a displacement amount of the pressure generating element at the second timing is estimated based on the estimated viscosity, the determination target information.

9. The method according to claim 7, wherein a viscosity of the liquid in the pressure chamber at the second timing is estimated based on a period of the residual vibration indicated by the determination target information, and a displacement amount of the pressure generating element at the second timing is estimated based on the estimated viscosity, the determination target information.

10. The method according to claim 7, wherein the signal generator generates, in addition to the inspection signal, an ejection signal for ejecting a liquid from the nozzle by being supplied to the pressure generating element, the method further comprising:

correcting the ejection signal based on the property change in the pressure generating element.

11. The method according to claim 7, further comprising:

providing a notification of information on the property change in the pressure generating element based on the determined property change in the pressure generating element.

12. The method according to claim 7, wherein the correspondence information is information that indicates, using a table or an arithmetic expression, for each viscosity of the liquid within the pressure chamber, the correspondence between the amplitude of the residual vibration and the displacement amount of the pressure generating element.

13. The method according to claim 7, wherein the correspondence information is a program that, by using a simulation with a lumped-element model, calculates, for each viscosity of the liquid within the pressure chamber, the correspondence between the amplitude of the residual vibration and the displacement amount of the pressure generating element.

* * * * *